UNITED STATES PATENT OFFICE.

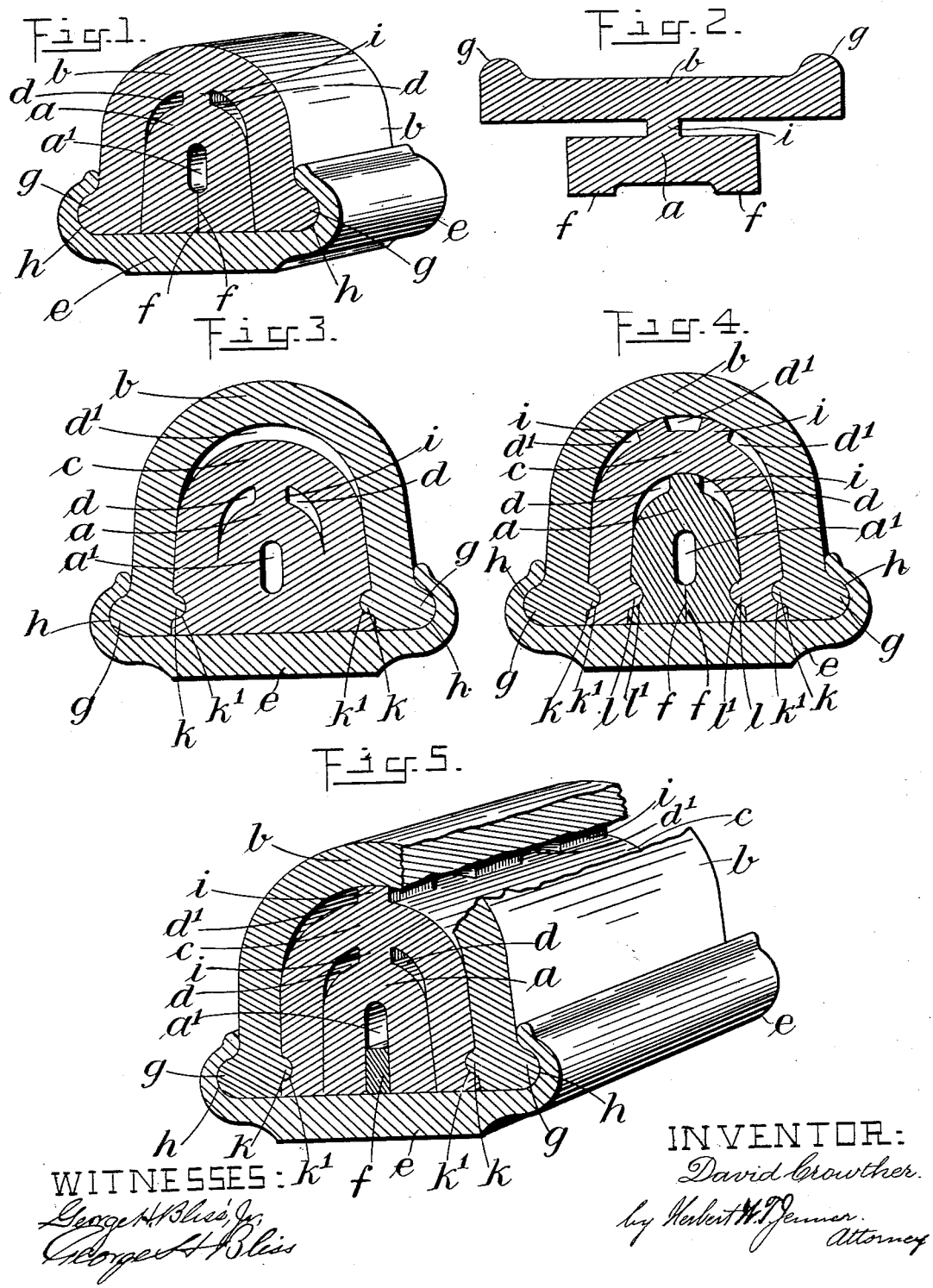

DAVID CROWTHER, OF MILNSBRIDGE, ENGLAND.

TIRE FOR WHEELS.

SPECIFICATION forming part of Letters Patent No. 580,255, dated April 6, 1897.

Application filed November 14, 1896. Serial No. 612,101. (No model.)

*To all whom it may concern:*

Be it known that I, DAVID CROWTHER, a subject of the Queen of Great Britain, residing at Milnsbridge, in the county of York, England, have invented certain new and useful Improvements in Tires for the Wheels of Bicycles, Tricycles, Carriages, Omnibuses, and other Vehicles or Road Rolling-Stock; and I do hereby declare the following to be a full, clear, and exact description of the invention, such as will enable others skilled in the art to which it appertains to make and use the same.

This invention relates to that class of tire for the wheels of cycles, carriages, omnibuses, and other vehicles or motor-cars which comprises two or more arches or arched sections of rubber or flexible material superimposed one above or outside another with an air-space between each arch.

The object of my invention is to produce an improved double or triple arched tire which will offer greater resistance to depression and give a quicker return or rebound on the pressure or weight being removed or as the tread of the tire leaves the ground, whereby the resilience of the tire is enhanced and its construction strengthened so as to render it suitable either for light or heavy vehicles or road rolling-stock.

My invention consists in certain novel features of construction of the double or triple arched tire for the purpose above stated, as will be hereinafter fully described.

Referring to the accompanying drawings, illustrating my invention, Figure 1 is a transverse section of my improved tire of double-arch section, a portion of which is shown in perspective. Fig. 2 is a transverse section of the double-arch tire as molded in the flat state. Fig. 3 is a transverse section of a triple-arched tire having my improvements applied. Figs. 4 and 5 are transverse sections of modified constructions of the triple-arched tire, the latter showing a portion of the tire in perspective and a section of the outer arch or tread broken off to show a modification of the strengthening or supporting rib or strip.

The same letters of reference indicate corresponding parts throughout.

In the drawings letter $a$ represents the inner arch or section, having a central opening or air-space $a'$, and $b$ the outer arch or tread of the tire. Between the arches $a\,b$ is an air-space or opening $d$. The two arches are compressed against each other at their lower ends or extremities to insert same into the rim $e$, and projecting faces $f\,f$ are molded on the lower inner sides of the arch $a$, which abut one against the other centrally of the tire and form a solid base thereto, by reason whereof such further compression of the base of the tire as would be liable to admit of its being pulled out of the rim $e$ by lateral or sidewise pressure exerted on the tire as the wheel turns or pivots will be avoided. The outer lower sides of the arch $b$ have beadings or shoulders $g\,g$ molded thereon, which are adapted to enter recesses in the sides of the rim $e$ and engage with the curved walls $h\,h$ thereof to hold the tire firmly and securely in said rim. Intermediate of the arches $a\,b$ and integral therewith or with one of said arches or solutioned to one or both arches is a rib or connecting-strip $i$, extending all around the tire centrally of the tread thereof, so as to be linable with the movement of depression.

When the tire is made or built up of three arches, namely, the inner arch $a$, outer arch $b$, and intermediate arch $c$, with air-spaces $d$ $d'$ between said arches, as illustrated in Figs. 3, 4, and 5, the rib or connecting-strip $i$ may be applied between the inner arch $a$ and the intermediate arch $c$, as shown at Fig. 3, or between said intermediate arch $c$ and the outer arch $b$, or between both the inner and intermediate arches and the outer and intermediate arches, as shown at Fig. 5; or I may apply two or more of such connecting-strips or ribs $i\,i$ between the intermediate and one of the other arches, and one or more ribs $i$ between the remaining arch and the intermediate arch, as illustrated at Fig. 4. In like manner two or more ribs may be applied to the double-arched tire.

It is preferable if the ribs or connecting-strips are required to be attached to the outer arch $b$ that they should be solutioned or cemented thereto by rubber solution, for the reason that when the outer arch becomes worn it can be easily detached and removed and a new outer arch substituted therefor without destroying or discarding the inner arch or arches. The central connecting-strip or supporting rib or ribs *i*, instead of being continuous or endless, may be molded or applied in segments or short lengths spaced at equidistances apart, as shown at the upper right-hand side of Fig. 5.

Although I have only shown and described the strips or ribs *i* as applied to the double and triple arched tires, it will be obvious that the same will apply to tires built up of more than three arches, but as in most cases the three arches would be the largest number employed in a tire I have not considered it essential to show more than that number.

The double-arched tire shown in Fig. 1 may be molded in its arched form or in the flat state shown at Fig. 2, which is subsequently bent to the arched section in applying it to the rim. In the triple-arched tires the inner arch *a* and intermediate arch *c* may be molded in one arched section, with the openings or air-spaces *a'* and *d* through same, as shown at Fig. 3, the outer arch *b* being provided on its inner sides near the bottom thereof with beads *k k*, which are adapted to enter and register with corresponding grooves or recesses *k' k'*, formed in the sides of the solid base of the inner double-arched section, or the three arched sections *a c b* may be molded separately and each held in position, one over the other, by the beadings *k k* and *l l* on the outer and intermediate sections, registering with grooves *k' k'* and *l' l'* on the intermediate and inner arches, respectively, as shown at Fig. 4, or, further, the inner and intermediate arches may be integral, as in the case of the double-arched tire shown at Fig. 1, and the outer arch *b* applied over same and held in position thereon by the beadings *k k*, as shown at Fig. 5. Instead of the projecting faces *f f* filling up the space between the bases of the inner arched section *a*, as shown in Figs. 1, 2, and 4, a piece of leather or block of material *f* may be inserted and secured in position by solution.

By molding beadings and corresponding grooves on opposing faces of the lower sides of each arched section, more particularly the sections which are separate from each other, said sections will be maintained in their relative positions when inserting the tire and after it is secured in the rim, and thereby avoid the necessity of solutioning the parts together for that purpose.

The rib or ribs or connecting-strips *i* form direct and solid connections between the crown of one arch and the under side of the tread or crown of the surrounding arch and give considerable resisting power to the depression of the outer arch or tread, such depression being direct upon the inner or intermediate and inner arch through said rib or ribs, wherefore there is a much quicker return or rebound when the pressure is removed or the tread leaves the ground. The resiliency of the tire is thus enhanced and more nearly approaches that of the pneumatic tire, while it is considerably strengthened in construction and adapted for the heavier class of vehicles or cars equally as for the light vehicles or machines. For the last named the application of the ribs or strips *i* enables the tire to be made lighter by reducing the thickness of each section, which is very advantageous. Further, when the arched sections of the tire are connected or joined together by a central rib or ribs, as set forth, the friction or pull on the tread or outer arch circumferentially is resisted by being distributed over the combined arched sections, which must each be stretched or drawn proportionately in the same direction.

I claim as my invention—

1. A tire comprising an arch-shaped section, an inner arch-shaped section provided with a central air-space *a'*, the outer side portions of the said inner section being arranged to bear against the inner side portions of the aforesaid section leaving air-spaces *d* above the crown of the inner section, and one or more distance-pieces *i* in the said air-spaces *d*, substantially as set forth.

2. The combination, with a grooved rim; of a tire comprising an outer arch-shaped section seated in the rim and provided with beads *g* for engaging with the flanges of the rim, and an inner section having its outer side portions arranged to bear against the inner side portions of the said outer section leaving an air-space in the outer section above the crown of the inner section, and the meeting side portions of the said sections being provided with interlocking beads and grooves, substantially as set forth.

3. A wheel-tire, comprising two or more arched sections superimposed one over the other with intervening spaces between and a central opening or air-space, the outer arch or section having beadings molded on the outer sides of its extremities adapted to engage with the curved recessed sides of the rim, and the inner sides of the outer, or outer and intermediate arches or sections having beadings or moldings thereon adapted to enter and engage with corresponding grooves in the opposing sides of the inner arch or arches, combined with a connecting or supporting rib or ribs extending from the apex or crown of one arched section to the crown of the surrounding arched section substantially as described.

In testimony whereof I affix my signature in presence of two witnesses

DAVID CROWTHER.

Witnesses:
 OWEN AVISON,
 THOMAS H. BARRON.